(12) United States Patent
Thiers et al.

(10) Patent No.: US 8,562,824 B2
(45) Date of Patent: Oct. 22, 2013

(54) CONTAMINANT PREVENTION

(75) Inventors: Eugene Thiers, San Mateo, CA (US); Richard J. Deep, Sunnyvale, CA (US); Douglas Michael Thom, Woodside, CA (US)

(73) Assignee: Sylvan Source, Inc., San Carlos, CA (US)

( * ) Notice: Subject to any disclaimer, the term of this patent is extended or adjusted under 35 U.S.C. 154(b) by 885 days.

(21) Appl. No.: 12/281,608

(22) PCT Filed: Mar. 2, 2007

(86) PCT No.: PCT/US2007/005270
§ 371 (c)(1),
(2), (4) Date: Mar. 10, 2009

(87) PCT Pub. No.: WO2007/103117
PCT Pub. Date: Sep. 13, 2007

(65) Prior Publication Data
US 2009/0308820 A1    Dec. 17, 2009

Related U.S. Application Data

(60) Provisional application No. 60/778,680, filed on Mar. 3, 2006, provisional application No. 60/779,201, filed on Mar. 3, 2006.

(51) Int. Cl.
*C02F 1/02* (2006.01)
(52) U.S. Cl.
USPC .................. 210/180; 55/418; 55/447; 55/452; 55/DIG. 23
(58) Field of Classification Search
USPC ......... 210/180, 259; 55/418, 447, 452, 459.1, 55/DIG. 23
See application file for complete search history.

(56) References Cited

U.S. PATENT DOCUMENTS 3,209,731 A * 10/1965 Schonberger et al. ........ 122/459
5,227,061 A    7/1993 Bedsole
5,810,895 A    9/1998 Staehle et al.
(Continued)

FOREIGN PATENT DOCUMENTS

GB    1514145    6/1978
GB    2012185    7/1979
(Continued)

OTHER PUBLICATIONS

EPO/ISA, "Notification of Transmittal of the International Search Report and the Written Opinion of the International Searching Authority, or the Declaration," corresponding International Patent Application No. PCT/US2007/005270, mailedon Sep. 7, 2007, 9 pages.

(Continued)

*Primary Examiner* — Robert A Hopkins
(74) *Attorney, Agent, or Firm* — Davis Wright Tremaine LLP

(57) ABSTRACT

Embodiments of the invention provide systems and methods for water purification. Embodiments can generally be applied to demister cyclones (6). Some embodiments allow for more of the pressure change which occurs in demister cyclones to occur in the separating chamber (19) of the demister cyclone. Some embodiments include a demister cyclone having an internal perforated wall (52). Some embodiments include a groove (103) or a baffle (102) on the underside of a boiler cover.

16 Claims, 12 Drawing Sheets

(56) References Cited

U.S. PATENT DOCUMENTS

| | | |
|---|---|---|
| 6,663,770 B2 | 12/2003 | Sears |
| 7,678,235 B2 | 3/2010 | Deep et al. |
| 2004/0103786 A1 | 6/2004 | Hiltunen et al. |
| 2007/0084713 A1 | 4/2007 | Deep et al. |

FOREIGN PATENT DOCUMENTS

| | | |
|---|---|---|
| WO | WO 99/30797 A1 | 6/1999 |
| WO | WO 2004/073562 A2 | 9/2004 |
| WO | WO 2004/075786 A1 | 9/2004 |
| WO | WO 2005/056153 A1 | 6/2005 |
| WO | WO 2005/056154 A1 | 6/2005 |
| WO | WO 2006/118912 A2 | 11/2006 |
| WO | WO 2007/008491 A2 | 1/2007 |
| WO | WO 2007/047674 A2 | 4/2007 |
| WO | WO 2007/103117 A2 | 9/2007 |

OTHER PUBLICATIONS

Egyptian Patent Office, *Official Notification*, issued in corresponding Egyptian patent application No. 2008091471, mailed on Jun. 5, 2011, 2 pages.

Israeli Patent Office, *Official Notification*, issued in corresponding Israeli patent application No. 193874, mailed on Jun. 15, 2011, 5 pages.

* cited by examiner

CONTAMINANT PREVENTION

BACKGROUND OF THE INVENTION

1. Field of the Invention

This invention relates to water purification systems and methods.

2. Description of the Technology

Distillation systems used for water purification rely on the evaporation of water containing contaminants, so as to produce steam which is essentially free of contaminants. Advanced distillation systems normally reduce volatile organic compounds (VOCs) by means of degassing and a very effective method of degassing entails steam stripping of the incoming water. Non-organic contaminants, such as dissolved salts or solid sediments, are normally removed during boiling, so that only clean steam is produced and subsequently allowed to condense into purified water. Advanced distillation systems can remove mist contaminants by means of a demister-cyclone which imparts high rotational forces to the steam containing mist particles, thus separating and subsequently discarding mist particles by centrifugal forces and allowing only clean steam to condense into the product water, as described in PCT application Nos: PCT/US2004/03993, filed Dec. 1, 2004, PCT/US2004/03991, filed Dec. 1, 2004 and U.S. nonprovisional application Ser. No. 11/255,083, filed Oct. 19, 2005, all of which are incorporated herein in their entireties.

Demister cyclones operate according to the principles of gas-cyclones, which separate gases from heavier (i.e., denser) solid or liquid particulates according to differences in specific gravity. Demister cyclones effect separation by imparting a rotational speed to the mixture of gases and particulates.

SUMMARY OF THE INVENTION

In some aspects, a demister cyclone with altered steam circulation is desirable. In some aspects, the demister cyclone involves a flow restrictor that is placed or configured in the demister cyclone so that at least some, more, or all of the change in pressure (e.g., pressure drop) that occurs when the steam enters the demister occurs when the steam enters the primary chamber of the demister, rather than immediately before entering the primary chamber.

In some aspects, a perforated interior shell can be used in a demister to improve the function of the demister.

In some situations, what is needed are ways of reducing contaminants that can enter a demister cyclone. This can be achieved through the use of mechanical barriers that prevent large mist particles from entering the demister cyclone, and/or grooves in the underside of the boiler cover that prevent the lateral migration of condensed water droplets from approaching and entering the entry port of the demister cyclone. In some situations, what is needed are design changes in the demister cyclone that either minimize disruption of the cyclonic action due to liquid flooding or that provide for a more effective mechanism for rejecting mist droplets and liquid splashes from clean steam. For some situations, a further desirable feature of such design modifications is that they should be inexpensive to install and operate in an advanced distillation system. In some embodiments, the various aspects can provide for improved demisting in water distillation systems that include degassing, demisting, boiling, and condensing operations.

In some aspects, an efficient method for improving the performance of a demister cyclone in an advanced water purification system that effects purification of contaminated water is provided.

In some embodiments, the demister cyclone operation can be achieved by a baffle, or combination of baffles, placed near the inlet of the demister cyclone, and grooves in the boiler cover of the water purification system, which can prevent or reduce the chance that water droplets that condense on the underside of the boiler cover can enter into the demister cyclone. The demister cyclone operation can also involve design changes in the demister cyclone that improve the separation of contaminated mist droplets from clean steam.

In some embodiments, the invention provides for improved demisting in water distillation systems that include degassing, boiling, demisting, and condensing operations.

In some aspects, the present invention includes an efficient method for improving the performance of a demister cyclone in an advanced water purification system that effects purification of contaminated water.

In some aspects, a demister cyclone is provided. It can include a curved separating chamber having a top portion, a bottom portion, and a curved wall connected to the top portion and to the bottom portion. It can further include an entry port into the curved separating chamber. The entry port can be located in a perimeter defined by or within the curved wall. The height of the entry port is less than the height of the curved wall. The demister cyclone further includes an inlet that allows an incoming flow (such as steam from a boiler) to enter the demister. The steam can then travel to the entry port to enter the curved separating chamber. A flow passing though the entry port is biased to travel along the curved wall, rather than to flow straight into the chamber. The demister cyclone further includes an outlet located towards a center portion of the curved separating chamber.

In some embodiments, the surface area of the cross section of the steam inlet is more than or substantially equal to the surface area of the cross section of the entry port. In some embodiments, the entry port is configured to cause steam to flow in a ribbon (for example, a relative wide flow) along a portion of the curved wall rather than a ribbon along the entire height of the curved wall when the steam enters the curved separating chamber. It can be an upper, lower, or middle portion of the wall. In some embodiments, the flow restrictor is configured to cause substantially all of the pressure drop from the steam entering the demister to occur inside the curved separating chamber of the demister. In some embodiments, substantially all of the pressure drop is oriented such that flow is forced along the curved wall of the large chamber. In some embodiments, the surface area of the entry port is less than or equal to the surface area of a low pressure entry port. A "low pressure entry port" is an entry port that has the same width as the entry port (or high pressure entry port), but has an increased height. The height of the low pressure entry port can be the distance between the top portion and the bottom portion. In some embodiments, the curved wall forms a circular separating chamber. The top border of the curved wall is connected to the top portion. The bottom border of the curved wall is connected to the bottom portion. The entry port is formed by a space created between a left border and a right border of the curved wall. In some embodiments, a flow restrictor is placed between the left border and the right border of the curved wall, so as to decrease the surface area of the entry port.

In some aspects, a demister cyclone is provided that includes a curved separating chamber having a top portion, a bottom portion, and a curved outer wall connecting the top portion to the bottom portion. The demister cyclone can also have an entry port to allow a flow to enter the curved separating chamber and a perforated inner wall located within the curved separating chamber. The perforated inner wall is configured such that mist particles can pass through said perforations. There is also an outlet located towards a center portion of the curved separating chamber. In some embodiments, the entry port is configured to release the flow (such as steam from a boiler) within the volume encompassed within the perforated inner wall. In some embodiments, the entry port is positioned such that the flow through the entry port is generally biased to flow along the perforated inner wall, the curved outer wall, or both walls. In some embodiments, the perforated inner wall is concentric to the curved outer wall. In some embodiments, the perforated inner chamber of the demister cyclone can be circular, parabolic, or spiral in shape. In some embodiments, there is also an exit port. In some embodiments, the exit port is located in an area defined between the curved outer wall and the perforated inner wall. In some embodiments, there is also an inlet that allows a flow from a boiler to enter the demister. The inlet is connected to the entry port and the entry port is positioned so as to direct the flow along the perforated inner wall.

In some aspects, a demister cyclone is provided that includes a curved separating chamber, having a top portion, a bottom portion, and a curved outer wall connecting the top portion to the bottom portion. The demister cyclone also has an entry port to allow a flow to enter the curved separating chamber and a perforated inner wall located within the curved separating chamber. The perforated inner wall can be configured so that mist particles can pass through the perforations. The entry port can be located along the perforated inner wall. The first outlet can be located towards a center of the top portion of the curved separating chamber. A second outlet can be located at a periphery of the bottom portion of the curved separating chamber.

In some aspects, a water purification system is provided that includes a boiling chamber having a boiler cover, a demister cyclone attached to the top of the boiler cover, a passageway between the demister cyclone and boiling chamber that passes through the boiler cover, and at least one of a baffle, metal groove, or a combination thereof, located close to the passageway on a bottom of the boiler cover. In some embodiments, the baffle, metal groove, or combination thereof is located on a boiler cover. The baffle, metal groove, or combination thereof is positioned to reduce the likelihood that splashes of liquid in the boiler or liquid associated with the internal surface of the boiler cover can enter the passageway. In some embodiments, the baffle, metal groove, or combination thereof is placed proximate to the passageway. In some embodiments, the baffle, metal groove, or combination thereof is placed between a portion of a first surface area on the internal surface of the boiler cover and a portion of a second surface area on the internal surface of the boiler cover, wherein the passageway is contained within the first surface area. In some embodiments, the baffle is made from metal, ceramic, or plastic plate or plates. In some embodiments, the baffle has a first structure that extends away from the internal surface of the boiler cover and does not prevent the flow of steam through the passageway. In some embodiments, the first structure is a plate. In some embodiments, the baffle further includes a second structure that is connected to the first structure. The second structure extends approximately parallel to the boiler cover, and the second structure extends over the passageway without preventing steam from flowing through the passageway. In some embodiments, the first structure is a plate that is approximately perpendicular to the internal surface of the boiler cover, and the second structure is a plate that is approximately perpendicular to the first structure. In some embodiments, the passageway is located towards the periphery of the boiler cover. In some embodiments, the groove is in the internal side of the boiler cover and is located proximate to the passageway. In some embodiments, a second groove is present on the internal side of the boiler cover. The second groove can be located proximate to the passageway. In some embodiments, a baffle can also be located proximate to the passageway.

In some aspects, a method for separating clean and dirty steam in a cyclone demister is provided. The method includes providing a demister cyclone that includes a curved separating chamber having the following: a top portion, a bottom portion, a curved wall connected to the top portion and the bottom portion, an entry port into the curved separating chamber, the entry port being located in a perimeter defined by the curved wall. The height of the entry port is less than the height of the curved wall. The demister cyclone further includes an inlet that allows an incoming flow to pass through the inlet and travel to the entry port and thereby enter the curved separating chamber. A flow passing through the entry port is biased to travel along the curved wall. The demister cyclone further includes an outlet located towards a center portion of the curved separating chamber. The method further includes flowing steam through the entry port and collecting steam from the outlet.

In some aspects, a method of separating clean and dirty steam using a demister cyclone is provided. One first provides a cyclone demister. One then flows a mixture of clean and dirty steam into the cyclone demister. One restricts the flow of the mixture of clean and dirty steam prior to the mixture's entrance into a chamber of the cyclone demister so that substantially all of a change in pressure that occurs as the steam enters the demister cyclone occurs as the steam enters the separating chamber.

In some aspects, a method for collecting clean steam is provided. The method includes providing a demister cyclone that includes a perforated inner wall located within the separating chamber of the demister cyclone. One can provide clean and dirty steam into a volume contained within the perforated inner wall and collect steam that exits from an exit portal located near the center of the top of the separating chamber of the demister cyclone. In some embodiments, the dirty steam is allowed to pass through the perforated wall and is removed from the demister cyclone via an exit portal located on the periphery of the demister cyclone.

In some aspects, a method of reducing contamination between a boiling chamber and a demister cyclone in a water purification system is provided. The method includes shielding a passageway that connects the boiling chamber to the demister. This can be done by using a groove in an inner side of a boiling chamber cover, a baffle that covers but does not block the passageway, or a combination of a groove and a baffle. In some embodiments, at least one groove is used on an inner side of the boiling chamber cover. In some embodiments, a baffle is used to shield the passageway.

DETAILED DESCRIPTION OF THE PREFERRED EMBODIMENT

Demister Cyclone

Figure 1:
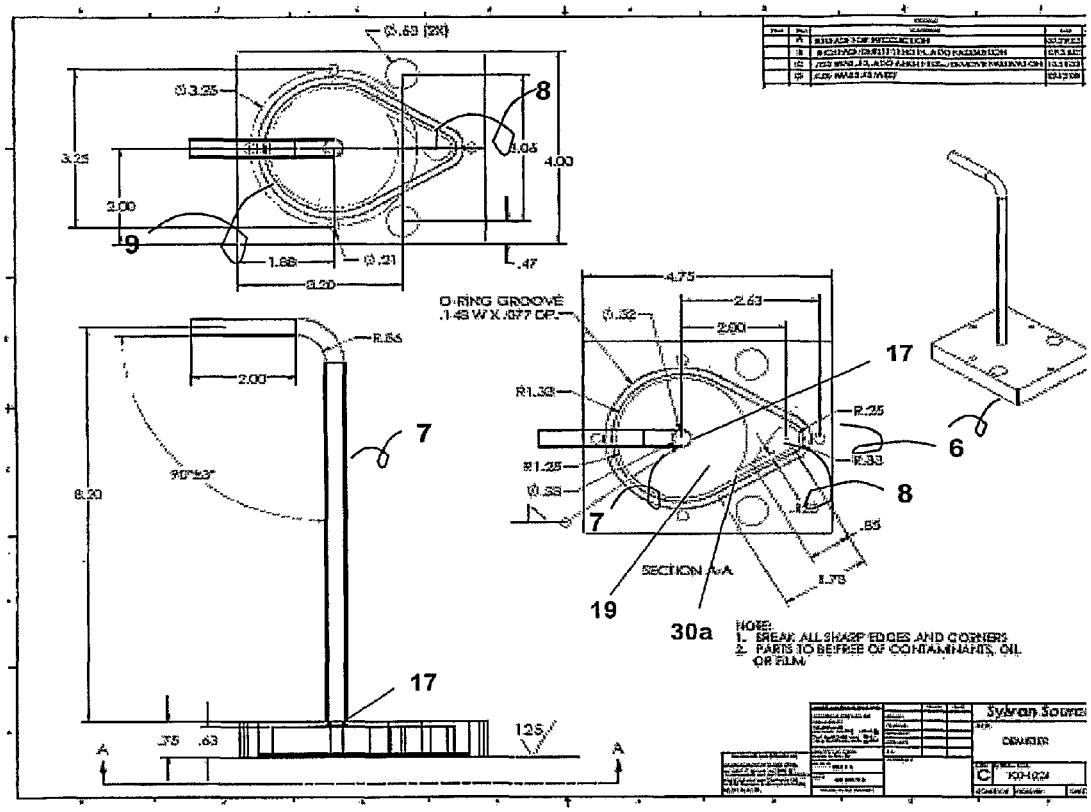
FIG. 1 is a drawing of a demister cyclone.
Figure 2:
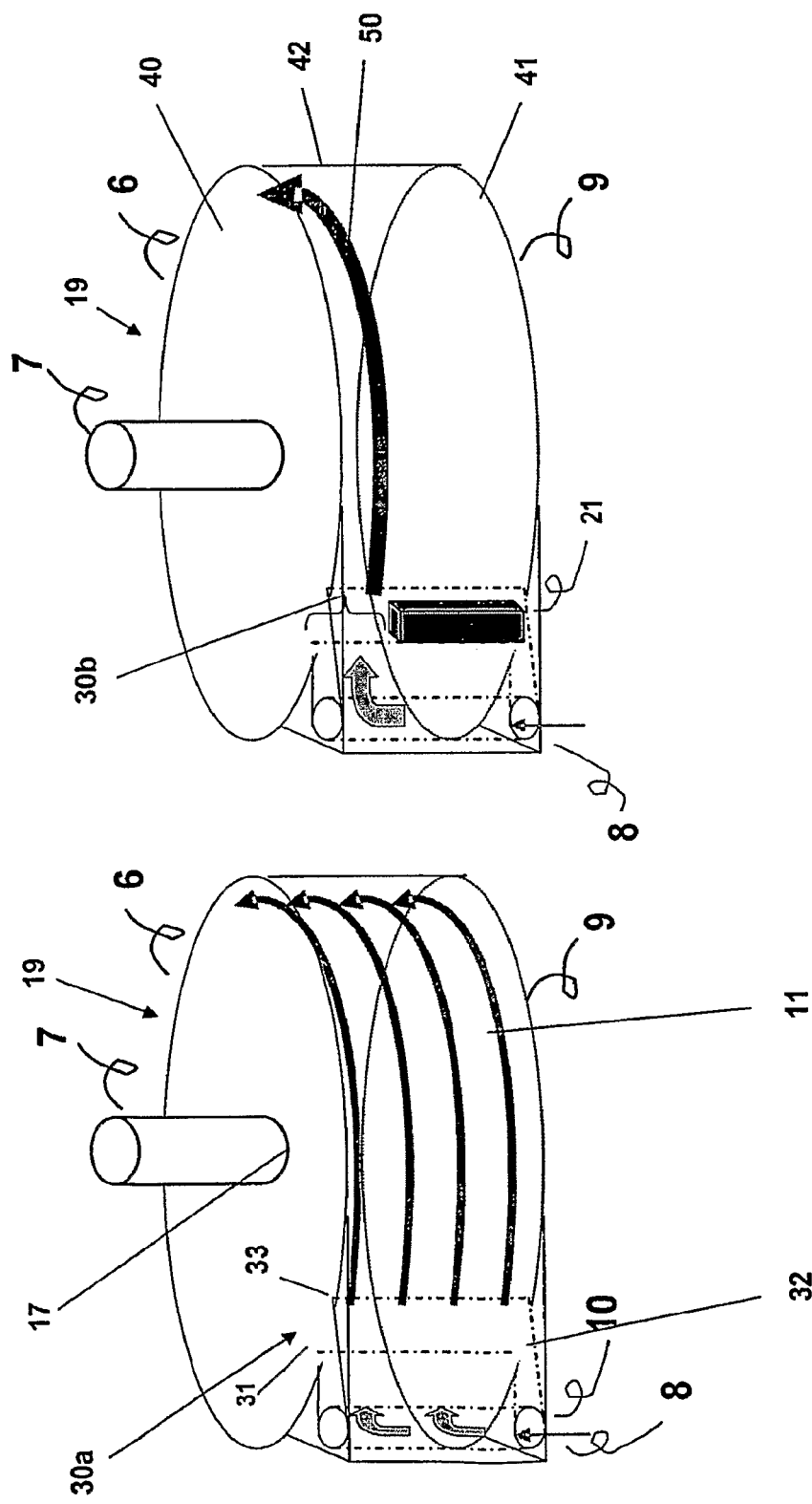
FIG. 2. is a drawing depicting modifications of a demister cyclone.

FIG. 1 is a drawing of a demister cyclone 6, as described in a patent application (U.S. provisional patent application No. 60/697,107, hereby incorporated by reference in its entirety). As shown in FIGS. 1 and 2 (left side), the demister cyclone 6 includes a curved separating chamber 19 that has a top portion 40, a bottom portion 41 and a curved wall 42 connecting the two portions. There is a steam inlet 8 allowing steam into the demister and an entry port 30a allowing steam into the curved separating chamber 19. There is also an exit port 17, from which relatively clean steam can be collected.

In general steam containing contaminants (e.g., as contaminated mist) enters the cyclone and is swirled along the periphery of the cyclone circumference 9 of the main chamber or curved separating chamber 19. Contaminated mist concentrates, by centrifugal action, on the periphery of the cyclone, while relatively clean steam can exist through an outlet 17 to an outlet tube 7. In some aspects, the present disclosure includes a more efficient method and device for separating mist particulates containing contaminants from clean steam in distillation systems. As shown below, in some embodiments, the present invention can include the addition of a flow restrictor or an inner perforated shell to enhance the capabilities of the demister cyclone.

FIG. 2 depicts one such addition to the demister cyclone 6 as well as showing the standard format of a demister cyclone. In the design on the left of FIG. 2, steam with contaminants enters the demister cyclone through an inlet 8, into an initial flow path 10, and then into the curved separating chamber 19 as a relatively wide ribbon of steam 11. The width of the ribbon of steam 11 is due to the height of the initial flow path 10 and the height of the entry port 30a (which are identical in the depicted embodiment). Because the height of the entry port 30a is about the same or is the same as the height of the wall of the chamber 42, the ribbon of steam can be as wide as the wall 42 is high. Additionally, because of the arrangement of the initial flow path 10 and the steam inlet 8, a significant amount of the pressure drop that occurs as the steam enters the demister occurs before the steam enters the curved separating chamber 19 of the demister. This can be detrimental for some embodiments of demister cyclones because energy that can be used to force a flow of steam around the curved separating chamber is being expended in an initial flow path 10 instead of to force steam around the curved separating chamber 19, thereby reducing the efficiency of the device. In the present application, the entry port 30a depicted on the right side of FIG. 2 can be described as a standard or (in light of the present disclosure) a "low pressure" entry port. As will be appreciated by one of skill in the art, the flow restrictor can be especially useful in demister cyclones similar to those shown in FIG. 2. In particular, in demister cyclones that have an initial flow path (in which some pressure can be lost) or in which the initial entry of the steam into the demister is in a direction that is different from the circular motion of the steam in the separating chamber. In some embodiments, these are demister cyclones that sit directly on top of a boiler cover. In some embodiments, these are demister cyclones in which the direction of the entry of the steam into the demister cyclone is different from the direction of the steam as it passes through the entry port. In some embodiments, the direction of entry of steam into the demister is ninety degrees to the direction of steam entering the separating chamber.

In the demister cyclone depicted on the right side of FIG. 2, a flow restrictor 21 is positioned in the initial flow path 10 of the demister so that the steam forms a relatively concentrated jet 50 when it enters the curved separating chamber 19. This smaller jet is caused by the fact that, while the width of the entry port 30b has not changed, the height of the entry port has decreased. Thus, the size or surface area of the cross section of the entry port 30b is effectively smaller than the size of the entry port 30a.

As will be appreciated by one of skill in the art, because the reduced size of the flow of the jet of steam 50, the jet 50 can have a greater velocity than the wider ribbon of steam 11. Thus, a higher velocity of steam can be made to enter the curved separating chamber 19 through the use of a flow restrictor 21. Additionally, the use of the flow restrictor 21 can allow for more of the force from the steam entering the demister to be utilized in the curved separating chamber 19, rather than in the initial flow path 10. For example, instead of a large amount of the pressure drop occurring in the upward direction as in the depiction on the left-hand side of FIG. 2, more of the pressure drop can occur along the wall in the direction of the rotating steam. Thus, the directionality of the change in pressure can be improved by using a flow restrictor.

As will be appreciated by one of skill in the art, the "pressure drop" is due to the change in environment as the heated steam escapes the boiler and enters the demister via the steam inlet 8 (e.g., as shown on the left-hand side of FIG. 2). Additionally, in light of the present disclosure, one of skill in the art will appreciate that the volume of the initial flow path can be minimized in some embodiments.

As will be appreciated by one of skill in the art, any of a number of arrangements can be used in order to bias the direction of the steam release. For example, the entry of the steam at an angle perpendicular to a radius of the circular chamber can help to bias the flow against the circular wall. Additionally, the open arrangement of the entry port 30b allows for the steam or flow to smoothly encounter the wall 42 and efficiently travel around the circular separating chamber 19. As will be appreciated by one of skill in the art, hydrodynamic forces can be optimized accordingly.

While a separate flow restrictor need not be present in every embodiment, in the embodiments it is present in, the height of the flow restrictor can vary. For example, the height of the flow restrictor can be less than, equal to, or greater than 1, 1-2, 2-5, 5-10, 10-20, 20-30, 30-40, 40-50, 50-60, 60-70, 70-80, 80-90, 90-95, 95-99% of the height of the wall 42.

As will be appreciated by one of skill in the art, the embodiment described in FIG. 2 is only one possible configuration of a demister cyclone. In some embodiments, the demister cyclone can include additional features, such as a conical section to provide for radial flow acceleration and additional residence time, or a lesser diameter to increase the radial acceleration and the pressure drop across the unit.

In some embodiments, the size of the entry port 30b of the steam into the main chamber 19 of the demister is the same size as the steam inlet 8, so that no substantial loss in pressure occurs until the steam is inside the chamber. In some embodiments, the entry port and the steam inlet are similarly sized. For example, the entry port 30b can be 10-50, 50-60, 60-70, 70-80, 80-90, 90-100, 100-110, 110-120, 120-130, 130-150, 150-200, 200-300 percent less or more than the size of the steam inlet 8. As will be appreciated by one of skill in the art, while the use of a flow restrictor 21 in the initial flow path 10 can create a volume in which the steam can gather, it can eventually become pressurized and any pressure drop due to the steam leaving the steam inlet can be reduced. However, as discussed below, the volume of space in the initial flow path 10 between the steam inlet 8 and the flow restrictor 21 can also be reduced as well.

As will be appreciated by one of skill in the art, while a separate flow restrictor 21 can be used, in some embodiments the function of the flow restrictor can be achieved by parts that are integral to the device. For example, the width of the entry port 30 can be narrowed, the wall 42 can be made to block off part of the entry port, or a pipe can be connected to the steam inlet 8 to direct the steam into the chamber (thereby removing the "dead space" shown in the initial flow path 10). Thus, a formal, separate, restrictor 21 need not be used in all embodiments. In some embodiments, all that is required to obtain an adequate flow restriction is that a cross section of the surface area of the entry port is similar in size to a cross section of the surface area of the steam inlet. For example, the surface area of the entry port 30b can be 10-50, 50-60, 60-70, 70-80, 80-90, 90-100, 100-110, 110-120, 120-130, 130-150, 150-200, 200-300 percent the size of the surface area of the steam inlet 8. Of course, since the entry port is angled along the circumference of the wall 42, the cross section of the entry port 30b can be taken from the first edge 31 of entry port 30b, and straight across the passage to point 32, rather than to the second edge 33.

In some embodiments, not only does the above pressure drop occur in the curved separating chamber 19, but the outward expansion of the steam occurs along the wall 42 so as to add more energy to the rotation of the steam. As noted above, in some embodiments, the device is configured so that more of the pressure drop occurs inside the curved separating chamber 19, allowing for more of the energy from the expansion of the steam to be released inside the large chamber. In some embodiments, all of the pressure drop occurs in the direction of rotation of the steam, however, any increase can be beneficial for some embodiments. In some embodiments, at least 1-5, 5-10, 10-20, 20-30, 30-40, 40-50, 50-60, 60-70, 70-80, 80-90, or 90-100% of the drop in pressure occurs in the large chamber, preferably in the direction of the flow of steam.

In some embodiments, there is a pipe running from the steam inlet 8 that can have a 90 degree bend so that it also points along wall 42 of the chamber or along the circumference of the chamber 9. In such an embodiment, while the first end of the pipe can be connected to the steam inlet 8, the second end can be positioned so as to force the steam around the curved separating chamber 19 in the desired manner and the second end of the pipe can serve as the entry port of the steam 30b.

As will be appreciated by one of skill in the art, in some embodiments, an improvement can be realized by matching the cross section of the entry port 30b to that of the steam inlet 8. Of course, any reduction in size of the entry port 30b to make it similar to that of the steam inlet 8, can also achieve some of the same results. Additionally, any manner by which the direction or amount of pressure drop can be repositioned or moved so that it occurs in the curved separating chamber 19, in the appropriate direction, can also improve the device. For example, the height of the chamber can be reduced by reducing the height of the wall 42. Alternatively, an additional flow restrictor 21 can be placed in the initial flow path 10 so that the volume of space in the initial flow path 10 is reduced. As will be appreciated by one of skill in the art, in some embodiments, the cross section of the flow path between the steam inlet 8 and the entry port 30b can be the same and can be similar, if not identical to, the cross section of the entry port 30b and the steam inlet 8.

The flow restrictor 21 (or regulator) can be employed alone or in combination with other embodiments disclosed herein.

Figure 3:
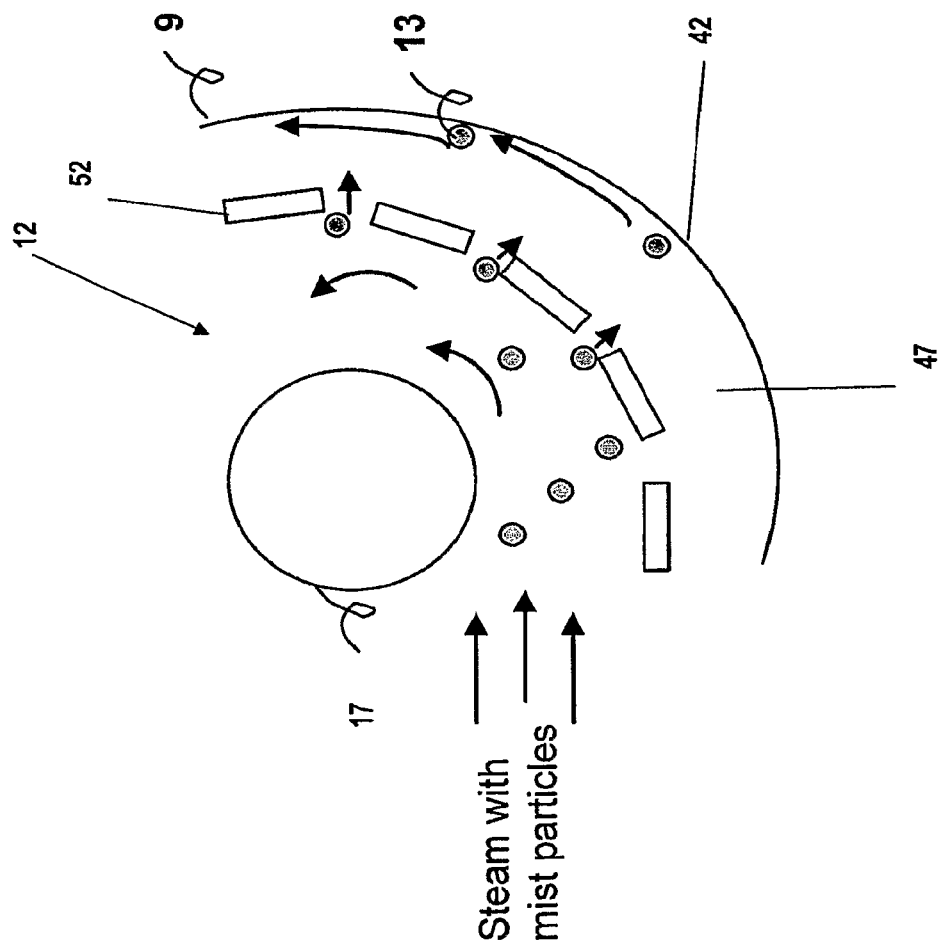
FIG. 3 is a diagram of the principle of a perforated cyclone.

FIG. 3 depicts an embodiment of a demister cyclone that includes a perforated inner chamber 12 that can be substantially concentric with the outer wall of the cyclone body 19. The chamber includes an outlet tube for clean steam 7. In this embodiment, the mixture of steam and contaminated mist particles 13 enter the cyclone in a circular path; however, they can enter the curved separating chamber closer to the center of the chamber 19. For example, the mist particles can be released within the perforated inner chamber 12. A piper or other structure can be used to move the steam from a steam inlet that is located on the periphery to create an entry port closer to the center of the chamber. Alternatively, the steam inlet 8 can be moved closer to the center of the chamber. The centrifugal forces make the mist particles concentrate at the perforated inner surface of the wall 52 of the inner chamber 12. The contaminated mist particles can pass through the small openings of the perforated wall 52 of the inner chamber 12, and be discharged (e.g., via an exit port 14), while the clean steam continues its rotating circular path and is discharged through outlet tube 7.

Figure 4:
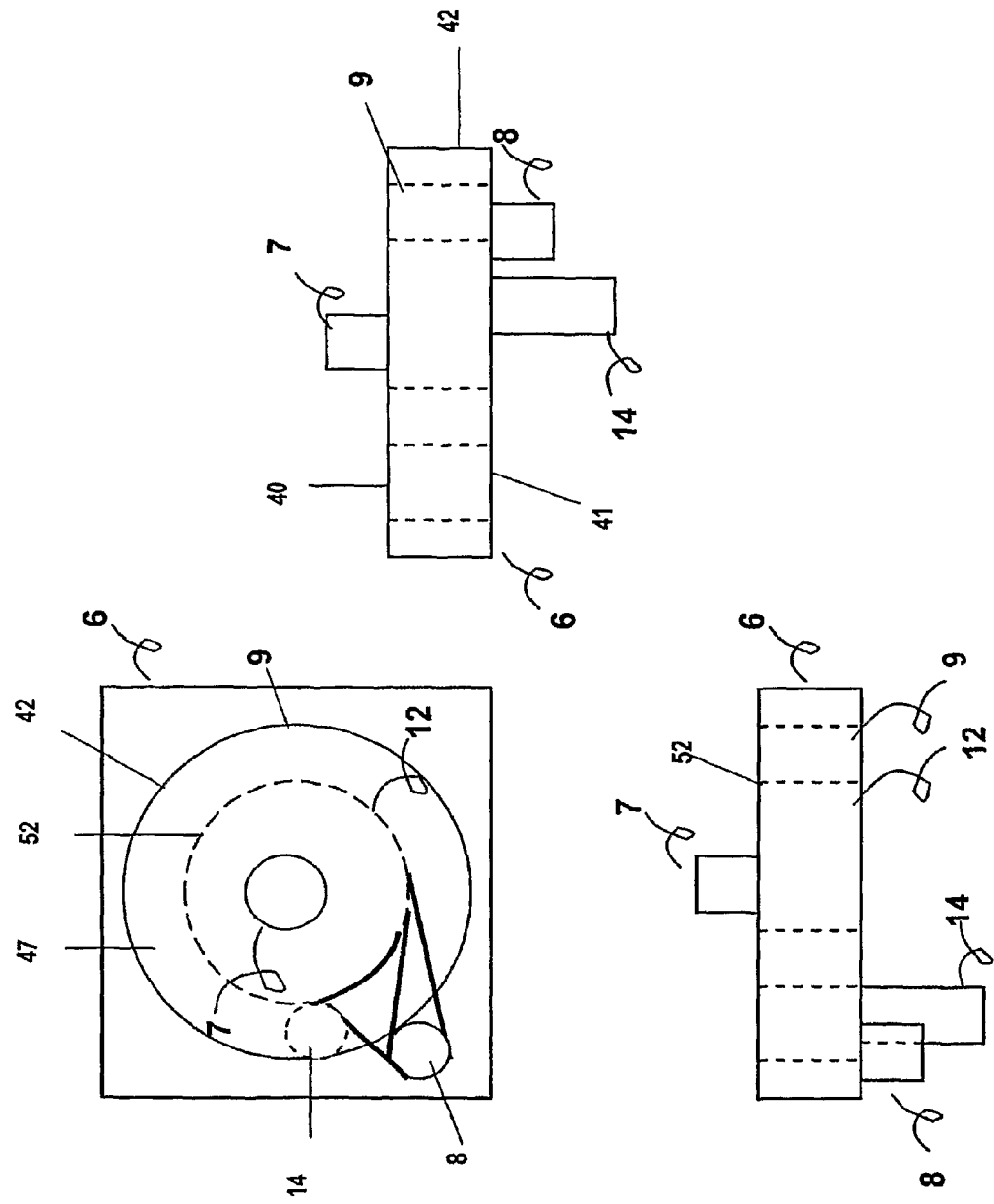
FIG. 4 is a diagram of an improved design for a demister cyclone.

As shown in FIG. 4, the mixture of steam and contaminated particles can enter through inlet 8 and swirl through the circular path defined by inside of the inner perforated wall 52. The heavier mist particles can pass into the outer circumference of the cyclone 47 and exit through an outer exit port 14, while clean steam exits thought outlet port 7. As will be appreciated by one of skill in the art, the exit port 14 can be connected to the boiler so that the waste water is recycled.

As will be appreciated by one of skill in the art, while the outer wall 42 can be generally circular, it need not always be concentric or even substantially concentric with respect to the inner chamber 12. In particular, the presence of the inner chamber 12 with its perforated wall 52 can help to establish a large amount of the centrifugal force in the system. Thus, the presence of the inner chamber can allow for more variation in the shape of the outer wall 42.

One of skill in the art will appreciate that the embodiment described in FIGS. 3 and 4 is one of various alternative embodiments. For example, the shape of the inner perforated chamber 12 and the wall 52 need not be circular, and can be parabolic or follow a spiral shape, depending on the size of the mist particles and the speed with which they migrate to the periphery of the cyclone body due to the action of centrifugal forces. The distances between the perforations can be adjusted as desired, as can the size of the holes or perforations. In some embodiments, the perforated inner chamber is configured so that the holes or perforations are at least 0.01% of the surface area of the curved walls of the inner chamber, however, larger amounts are contemplated, e.g., 0.01-1, 1-2, 2-5, 5-10, 10-20, 20-30, 30-40, 40-60, 60-80, 80-90, 90-95, 95-98, 98-99, 99-99.5, or more percent of the surface area of the perforated inner chamber can be holes. The holes should be at least large enough to allow water vapor to pass through, and can be larger. In some embodiments, the holes are 0.01 to 10 mm in diameter, e.g., 1 mm, although a larger range of hole sizes can be used as well. The holes need not all be the same size. As will be appreciated by one of skill in the art, the size can depend upon the particular arrangements and dimensions of the demister.

In some embodiments, the restrictor and perforated inner chamber can be used in combination for additional advantages.

Reduction of Demister Contaminants

It has been recognized that, in some situations, the normal boiling action in a water purification processes can produce micro-particles of mist that contain the same contaminants found in the boiling water. Such mist particles can be carried by the steam into the steam condenser, thus contaminating the product water. It has also been recognized that, in some situations, the normal operation of a demister cyclone can be disrupted by the sudden influx of splash water from the boiler, which can flood the cyclone. In addition, water droplets that condense on the underside of the boiler cover and contain salt contaminants can enter the cyclone as they migrate laterally on the boiler cover, thus introducing large amounts of liquid that overwhelm the cyclonic action. Also, mist particles from the boiling action can collide and grow, and can be carried into the demister cyclone by the high velocity of the steam near the cyclone entry point, and they can disrupt the normal operation of the demister unit.

In some aspects, the present invention involves a more efficient method, device, or means of separating mist particulates containing contaminants from clean steam in distillation systems, particularly in "advanced distillation systems." Some embodiments include various options for preventing large water droplets containing contaminants from entering the demister-cyclone from the boiling chamber, and other alternative configurations that improve the operation of the demister-cyclone.

Figure 5:
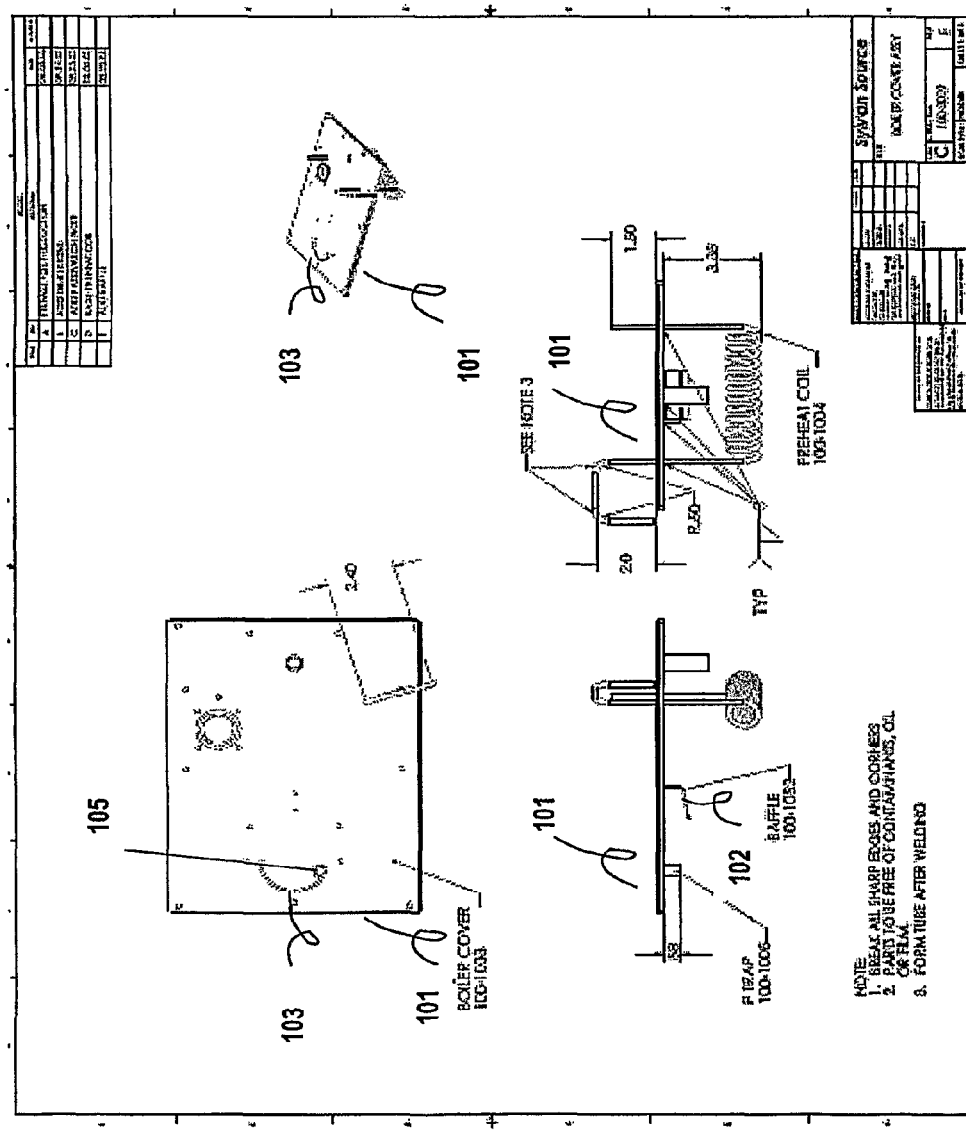
FIG. 5 is a drawing of the boiler cover of a distillation system.

Two methods and devices for preventing mist particles or splashes of water containing contaminants from entering the cyclone are described with reference to FIGS. 5-12. FIG. 5 depicts a boiler cover 101 of an advanced distillation system (e.g., U.S. patent application Ser. No. 11/255,083, hereby incorporated by reference in its entirety) that shows a mechanical baffle 102 and metal grooves 103. As described herein, either or both of these can be used to reduce the amount of contamination that leaves the boiler. Of course, both need not be employed at once. The boiler cover 101 has a top side 150, to which, in some embodiments, a demister-cyclone can be placed, and a bottom, underside, or internal side 151, which is exposed to the inner workings of the boiler.

Figure 6:
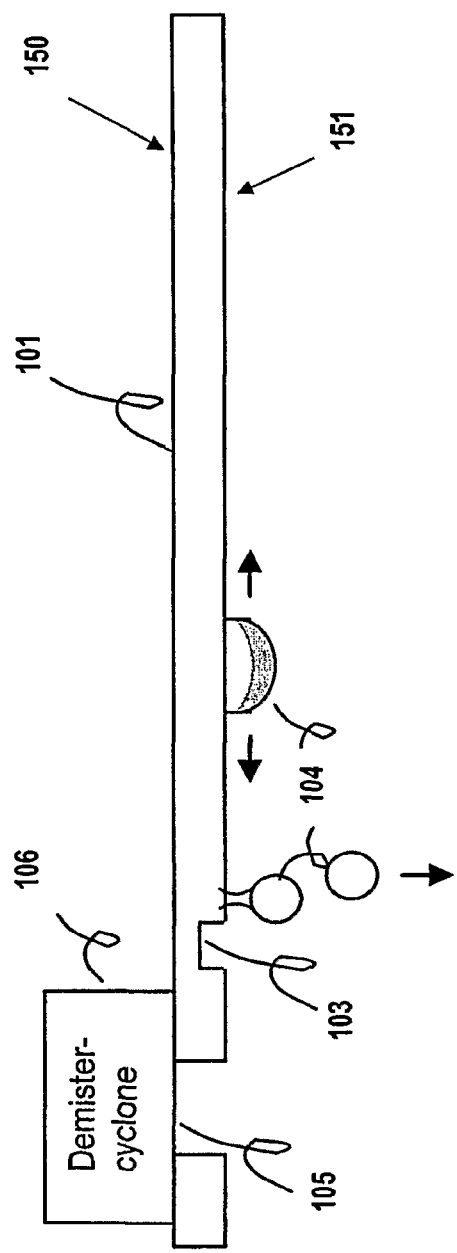
FIG. 6. is a diagram of a metal groove.

As shown in the FIG. 6, a metal groove 103 can be included in the bottom side of the boiler cover 101. Preferably, the groove 103 is placed next to a steam inlet 105 (also depicted as item 8 in FIG. 1). However, the groove 103 need not be placed immediately next to the inlet 105. The groove can be a single groove, or there can be multiple grooves, such as 2, 3, 4, 5, 6-10, or more in the underside of the boiler cover. Additionally, the groove can be positioned such that it separates some portion of the underside of the boiler cover from the inlet 105. As shown in the FIG. 6, the groove 103 separates most of the underside of the boiler cover from the inlet 105. Mist particles 104 that either impinge on the underside of the boiler cover 101 or water droplets 104 that condense on the underside of the boiler cover and that migrate along the boiler cover are prevented or slowed from reaching the inlet 105 of the demister cyclone 106 by the presence of a groove 103. Instead, mist or droplets of contaminated water can grow in size upon reaching the metal groove and drop by gravity into the boiling water, thus preventing or reducing the likelihood of the entry of large liquid drops into the demister.

Figure 7:
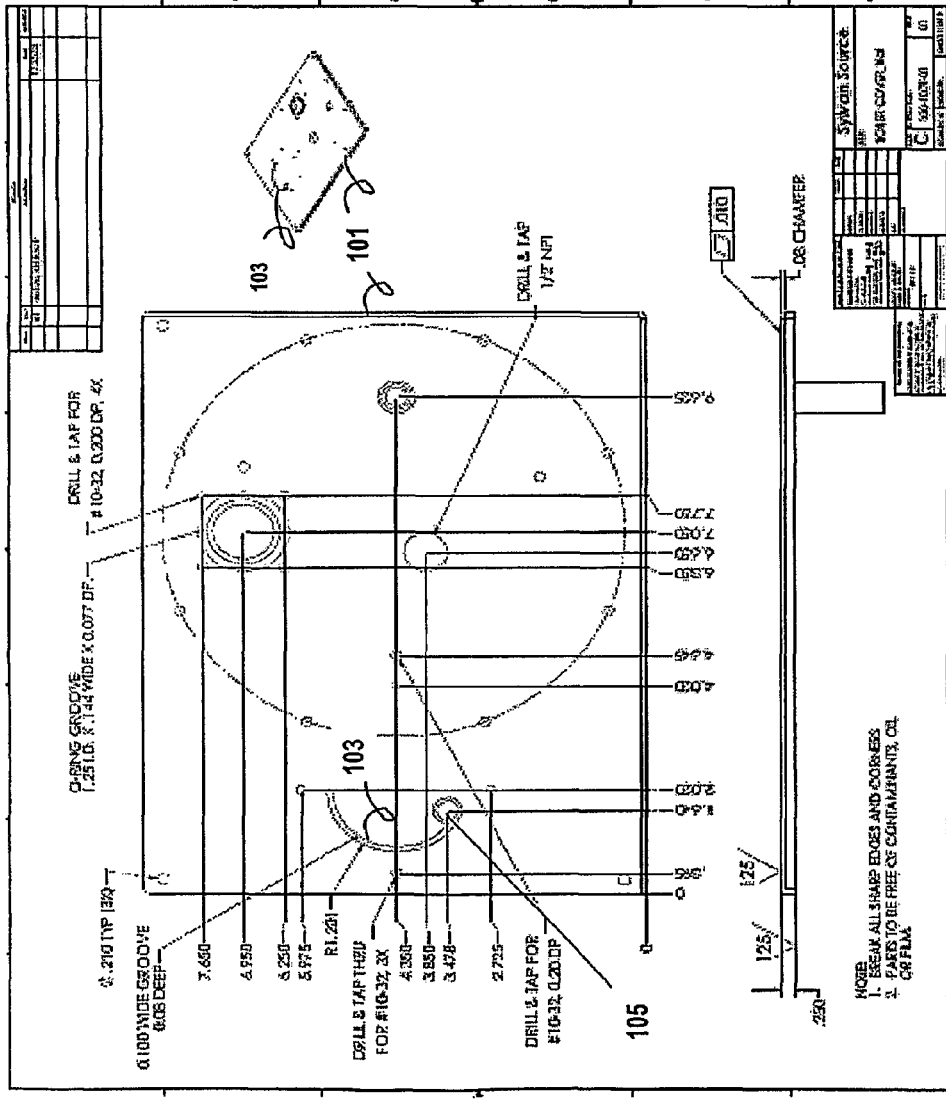
FIG. 7 is a drawing of the metal groove position on the boiler cover.
Figure 8:
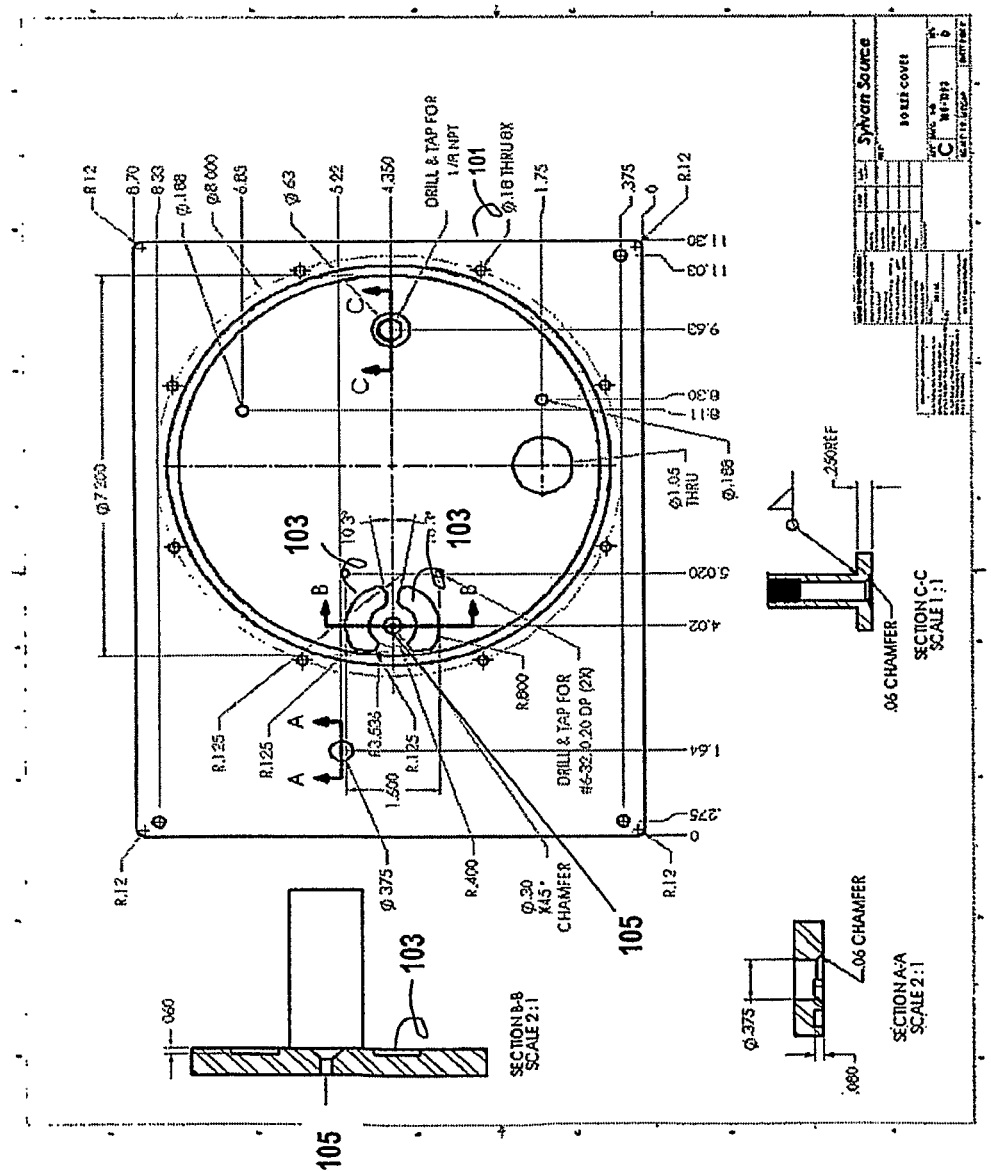
FIG. 8 is a drawing of an alternative groove position on the boiler cover.
Figure 9:
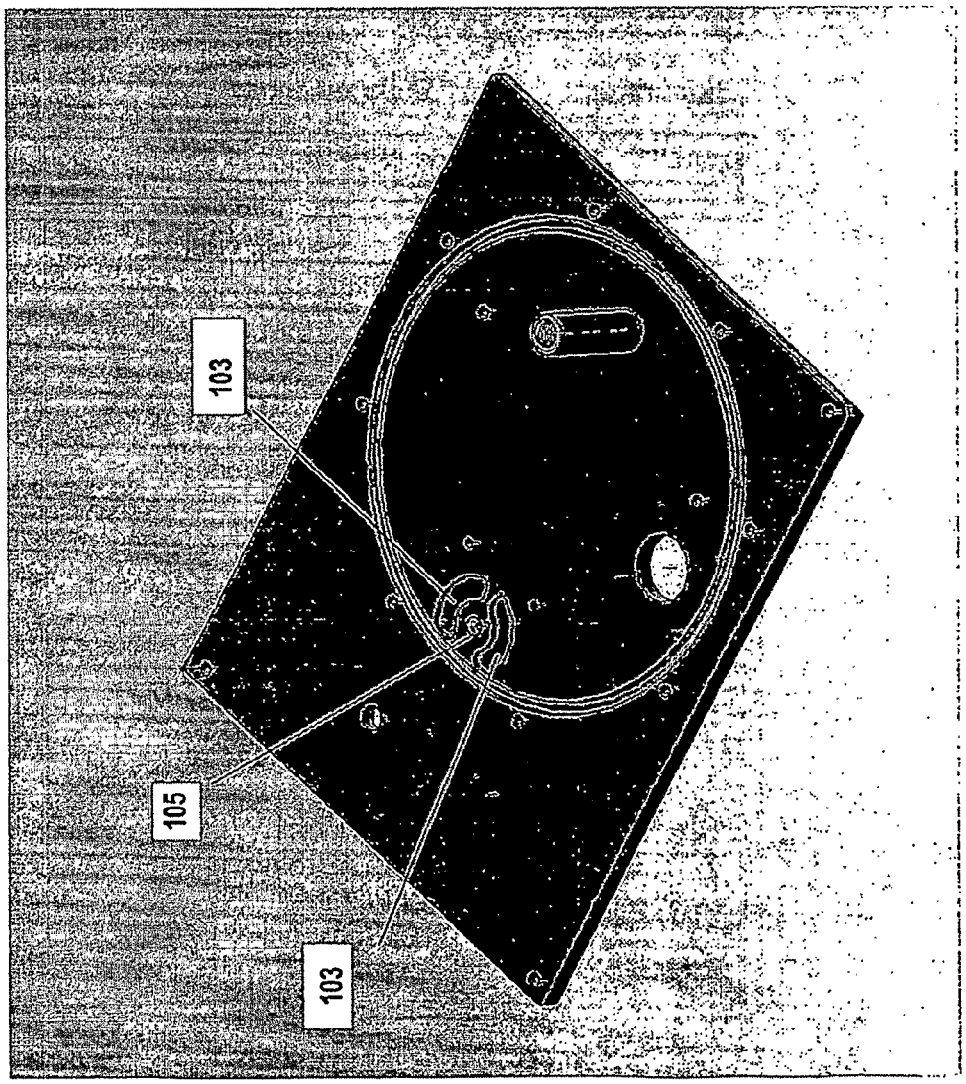
FIG. 9 is a depiction of one embodiment of a pair of metal grooves on the boiler cover.

FIGS. 7, 8, and 9 show different embodiments of metal grooves 103 that are cut into the underside of the boiler cover 101. As will be clear to those skilled in the art, the embodiments described in FIGS. 7 and 8 are only two possible configurations of mechanical barriers that prevent the lateral migration of condensed water droplets on the internal side of the boiler cover. Therefore, a plurality of metal grooves can certainly be utilized as well. Additionally, the metal grooves can be curved around the inlet 105 so as to allow for greater separation between the inlet 105 and the rest of the underside of the boiler cover. In some embodiments, a single groove 103 completely encircles the inlet 105. In some embodiments, concentric grooves are used to separate the inlet 105 from the rest of the underside of the boiler cover, without completely encircling the inlet with any single groove. For example, with the two grooves 103 in FIG. 8, a third groove can be placed so as to section off the surface between the two grooves from the rest of the underside of the boiler cover. As will be appreciated by one of skill in the art, ridges or projections can also be used to reduce the movement of liquid along the underside of the boiler cover. Thus, in some embodiments, any obstruction along the underside of the boiler cover that reduces the movement of liquid or steam to the inlet 105 can be used.

In some embodiments, the grooves are larger than the largest size droplet that can condense on the underside of the boiler top.

Figure 10:
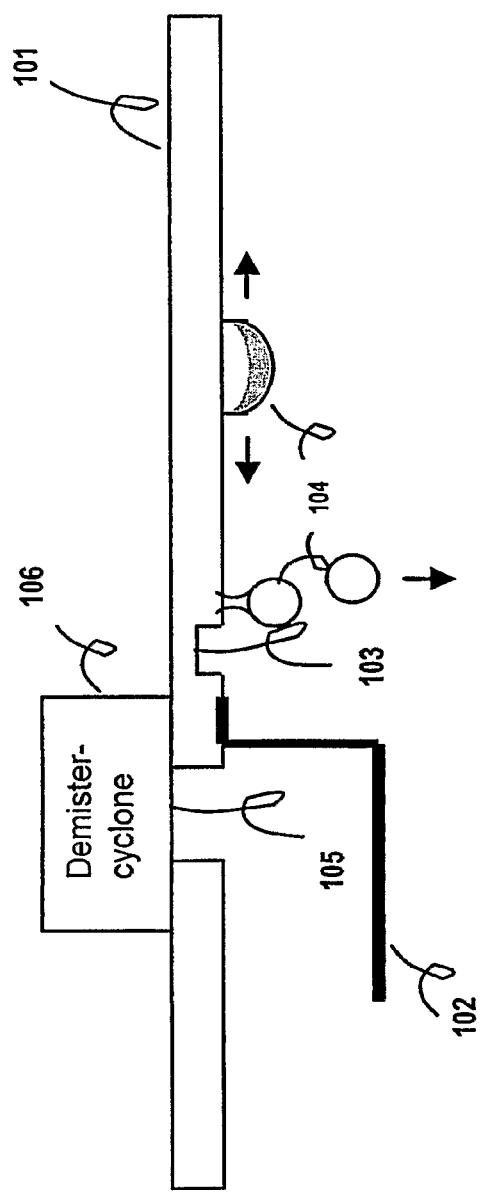
FIG. 10 is a diagram of a baffle guard.
Figure 11:
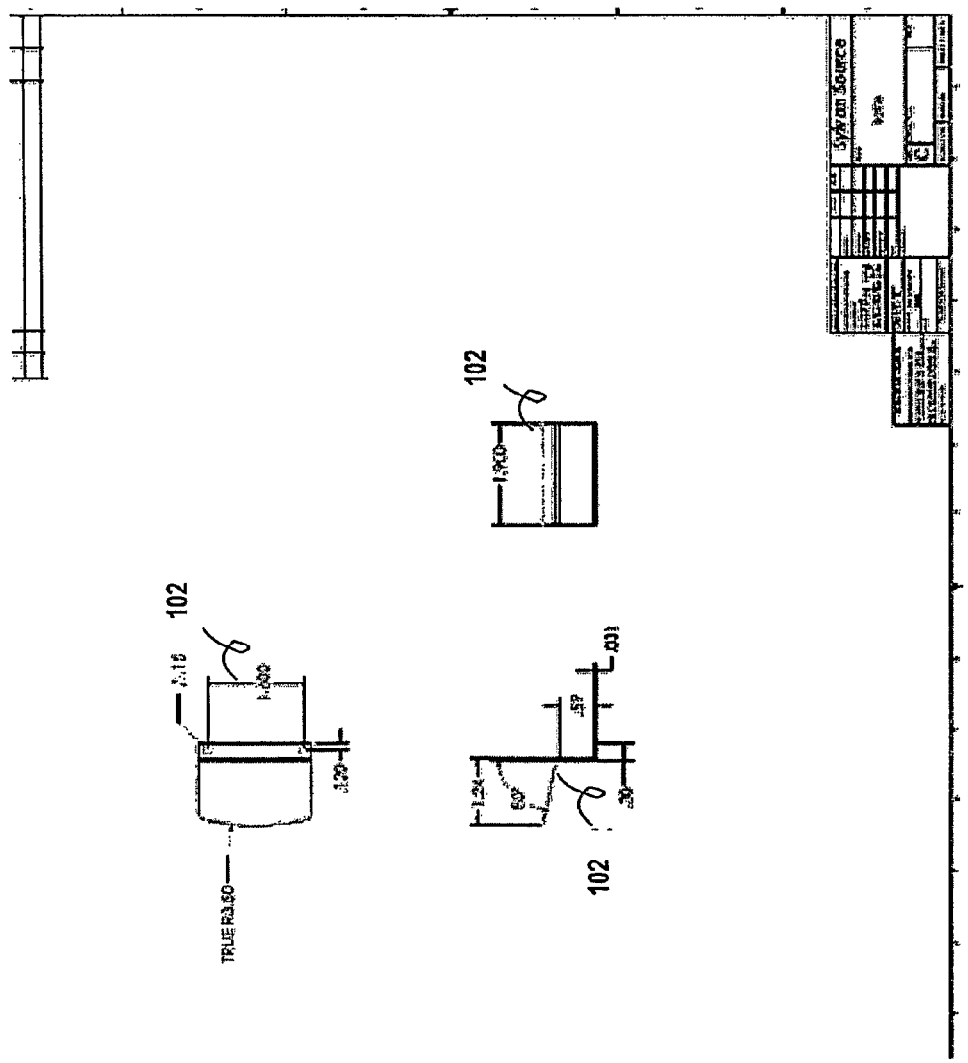
FIG. 11 is a drawing of a baffle guard.
Figure 12:
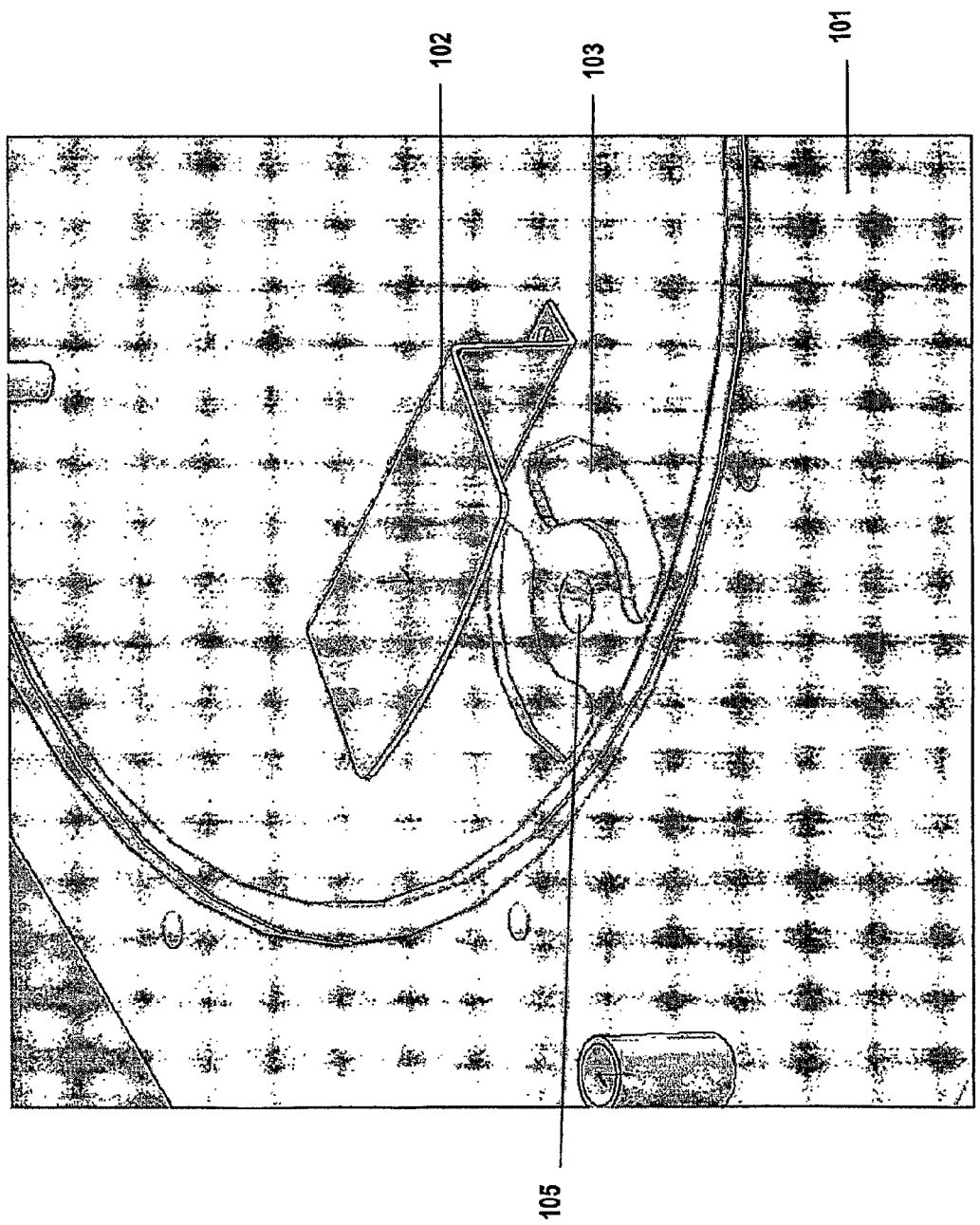
FIG. 12 is a depiction of the baffle guard on the boiler cover.

In some embodiments, a different or additional structure(s) can be used to prevent contamination. FIG. 10 is a diagram of a baffle or baffle guard 102 that is mounted on the underside of the boiler cover 101 and that prevents or reduces the likelihood that large droplets of contaminated water can enter the inlet 105 to the demister cyclone 106. FIG. 11 shows an embodiment of the baffle guard 102. FIG. 12 shows a depiction of the baffle guard 102 as mounted on the underside of a boiler cover 101 (although it need not include the grooves 103).

Those skilled in the art will recognize that the baffle can be made of metal, ceramic, plastic, or other materials. Furthermore, other embodiments, involving different orientations of the baffle guard, other configurations of said baffle guard, and other dimensions of the baffle guard are also possible according to the teachings herein.

In some embodiments, such as the one depicted in FIG. 9, the baffle or baffle guard 102 includes a portion that is approximately perpendicular to the boiler cover 101 and a second section that is approximately parallel with the boiler cover 101. As will be appreciated by one of skill in the art, the angles and sizes of the two sections can vary dramatically and still provide substantial benefits for reducing or preventing splash events or other contaminating events from entering through the inlet 105 as readily as it can without the protective device. In some embodiments the size of the sections can vary from a few millimeters up to several centimeters, depending on the flow velocity of the steam.

Additionally, it will be appreciated by one of skill in the art, in light of the present disclosure, that the baffle 102 can take on a variety of shapes and sizes, as long as it is capable of blocking or separating the passageway from some volume of the boiler chamber, without preventing the passageway from allowing the passage of steam through to the demister cyclone. For example, the baffle can be a single plate or structure that sticks out perpendicularly from the underside of the boiler cover. Alternatively, as shown in FIG. 10, the baffle can have an additional plate, or structure, connected to the first, where the second plate or structure is located beneath the passageway. Of course, the angles between the plates or structures need not be ninety degrees and can be more or less than ninety degrees, as long as they serve their purpose without completely blocking the passageway to the flow of steam into the demister. As will be appreciated by one of skill in the art, some embodiments of the baffle 102 can reduce the flow of steam through the passageway 105, this can be acceptable for various embodiments as long as it does not prevent the flow of steam through the passageway.

In some embodiments, additional structures are included in the baffle, for example, additional plates can be used to further enclose the space surrounding the passageway. Additionally, while the baffle can be made of or include solid plates, the structures can be screens or include slits, so as to generally block large droplets while allowing smaller mist sized particles to proceed. In some embodiments, the baffle includes a screen, which can simply be placed in front of the passageway or even over the passageway. In other embodiments, the baffle includes a woven or spun material, for example a metal wool (for example aluminum wool), which can be placed over or in the passageway. Alternatively, it can be placed around the passageway on the inner surface of the boiler cover.

In some embodiments, the grooves and baffles can be combined for additional advantages. In some embodiments, the grooves and baffles can be applied to situations in which there are additional passageways between the demister and the boiler, for example, if there is a waste port 14, either or both of these devices can be used in conjunction with such a passageway. Similarly, the baffles and grooves can be used with any other passageways located on the boiler cover or upper sections of the boiler chamber.

In some embodiments, the system for purifying water, embodiments of which are disclosed herein, can be combined with other systems and devices to provide further beneficial features. For example, the system can be used in conjunction with any of the devices or methods disclosed in U.S. Provisional Patent Application No. 60/676,870 entitled, SOLAR ALIGNMENT DEVICE, filed May 2, 2005; U.S. Provisional Patent Application No. 60/697,104 entitled, VISUAL WATER FLOW INDICATOR, filed Jul. 6, 2005; U.S. Provisional Patent Application No. 60/697,106 entitled, APPARATUS FOR RESTORING THE MINERAL CONTENT OF DRINKING WATER, filed Jul. 6, 2005; U.S. Provisional Patent Application No. 60/697,107 entitled, IMPROVED CYCLONE DEMISTER, filed Jul. 6, 2005; PCT Application No: US2004/039993, filed Dec. 1, 2004; PCT Application No: US2004/039991, filed Dec. 1, 2004; and U.S. Provisional Patent Application No. 60/526,580, filed Dec. 2, 2003; U.S. non-provisional application Ser. No. 11/255,083, entitled WATER PURIFICATION SYSTEM, filed Oct. 19, 2005, each of the foregoing applications is hereby incorporated by reference in its entirety. Additionally, the embodiments disclosed in U.S. provisional applications Nos. 60/778,680 and 60/779,201, both filed Mar. 3, 2006 the entireties of both of which are hereby incorporated by reference, can also be combined with the presently disclosed embodiments for an improved device.

A discussion of heat pipes for transferring heat from condensing steam to inlet water is provided in U.S. Provisional Patent Application Nos. 60/727,106 entitled, ENERGY-EFFICIENT DISTILLATION SYSTEM, filed Oct. 14, 2005, and 60/748,496, of the same title, filed Dec. 7, 2005, and PCT application No: PCT/US2006/040553, filed Oct. 16, 2006 each of which are incorporated herein by reference in its entirety.

What is claimed is:

1. A water purification system comprising:
a boiling chamber comprising a boiler cover;
a demister cyclone attached to a top of said boiler cover; wherein the demister cyclone comprises a curved separating chamber comprising: a top portion; a bottom portion; and
a curved wall connected to the top portion and to the bottom portion;
an entry port into the curved separating chamber, wherein said entry port is located in a perimeter defined by the curved wall, wherein a height of the entry port is less than a height of the curved wall;
an inlet, whereby an incoming flow can pass through the inlet to the entry port and thereby enter the curved separating chamber, wherein a flow passing through the entry port is biased to travel along the curved wall; and
an outlet located towards a center portion of the curved separating chamber;
a passageway between the demister cyclone and boiling chamber, through the boiler cover; and
at least one of a baffle, metal groove, or a combination thereof, located proximate to the passageway on a bottom of said boiler cover.

2. The water purification system of claim 1, wherein the baffle, metal groove, or combination thereof is located on a boiler cover, wherein the baffle, metal groove, or combination thereof is positioned to reduce the likelihood that splashes of liquid in the boiler or liquid associated with an internal surface of the boiler cover will enter the passageway.

3. The water purification system of claim 2, wherein the baffle, metal groove, or combination thereof is placed proximate to the passageway.

4. The water purification system of claim 2, wherein the baffle, metal groove, or combination thereof is placed between a portion of a first surface area on the internal surface of the boiler cover and a portion of a second surface area on the internal surface of the boiler cover, wherein the passageway is contained within the first surface area.

5. The water purification system of claim 1, wherein the baffle is made from metal, ceramic, or plastic plate.

6. The water purification system of claim 1, wherein the baffle comprises a first structure that extends away from the internal surface of the boiler cover and does not prevent the flow of steam through the passageway.

7. The water purification system of claim 4, wherein the first structure is a plate.

8. The water purification system of claim 4, wherein the baffle further comprises a second structure that is connected to the first structure, wherein the second structure extends approximately parallel to the boiler cover and wherein the second structure extends over the passageway without preventing steam from flowing through the passageway.

9. The water purification system of claim 6, wherein the first structure is a plate that is approximately perpendicular to the internal surface of the boiler cover and the second structure is a plate that is approximately perpendicular to the first structure.

10. The water purification system of claim 1, wherein the passageway is located towards a periphery of the boiler cover.

11. The water purification system of claim 1, wherein the groove is in an internal side of the boiler cover and is located proximate to the passageway.

12. The water purification system of claim 11, further comprising a second groove in the internal side of the boiler cover, wherein the second groove is located proximate to the passageway.

13. The water purification system of claim 12, further comprising a baffle located proximate to the passageway.

14. A method of reducing contamination between a boiling chamber and a demister cyclone in a water purification system, said method comprising shielding a passageway that connects the boiling chamber to the demister by using a groove in an inner side of a boiling chamber cover, a baffle that covers but does not block the passageway, or a combination of a groove in an inner side of a boiling chamber cover and a baffle that covers but does not block the passageway.

15. The method of claim 14, wherein at least one groove is used on an inner side of the boiling chamber cover.

16. The method of claim 14, wherein a baffle is used to shield the passageway.

\* \* \* \* \*

UNITED STATES PATENT AND TRADEMARK OFFICE
CERTIFICATE OF CORRECTION

PATENT NO.        : 8,562,824 B2
APPLICATION NO.   : 12/281608
DATED             : October 22, 2013
INVENTOR(S)       : Thiers et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this
Fifteenth Day of September, 2015

Michelle K. Lee
*Director of the United States Patent and Trademark Office*